United States Patent
Mital et al.

(10) Patent No.: US 8,332,825 B2
(45) Date of Patent: Dec. 11, 2012

(54) DYNAMICALLY MONITORING APPLICATION BEHAVIOR

(75) Inventors: Vijay Mital, Redmond, WA (US); Greg Lindhorst, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1123 days.

(21) Appl. No.: 12/146,495

(22) Filed: Jun. 26, 2008

(65) Prior Publication Data
US 2009/0328008 A1  Dec. 31, 2009

(51) Int. Cl.
*G06F 9/44* (2006.01)
(52) U.S. Cl. ........ 717/130; 717/124; 717/126; 717/127; 717/128; 717/131; 714/38.1
(58) Field of Classification Search ........................ None
See application file for complete search history.

(56) References Cited

U.S. PATENT DOCUMENTS

| | | | |
|---|---|---|---|
| 6,086,618 A | 7/2000 | Al-Hilali et al. | |
| 6,721,941 B1 * | 4/2004 | Morshed et al. | 717/127 |
| 6,816,882 B1 | 11/2004 | Conner et al. | |
| 6,868,539 B1 | 3/2005 | Travison et al. | |
| 6,904,449 B1 | 6/2005 | Quinones | |
| 6,959,432 B2 * | 10/2005 | Crocker | 717/126 |
| 7,058,924 B2 | 6/2006 | Greenstein | |
| 7,174,379 B2 | 2/2007 | Agarwal et al. | |
| 7,178,143 B2 | 2/2007 | Pugh et al. | |
| 7,349,966 B2 | 3/2008 | Colby et al. | |
| 7,457,989 B2 * | 11/2008 | Ulrich et al. | 714/38.14 |
| 7,739,282 B1 * | 6/2010 | Smith et al. | 707/736 |
| 7,770,031 B2 * | 8/2010 | MacKay et al. | 713/193 |
| 7,827,536 B2 * | 11/2010 | Armstrong et al. | 717/127 |
| 7,890,946 B2 * | 2/2011 | Blumfield et al. | 717/171 |
| 7,912,877 B2 * | 3/2011 | Shankar et al. | 707/813 |
| 8,136,102 B2 * | 3/2012 | Papakipos et al. | 717/140 |
| 2002/0087949 A1 * | 7/2002 | Golender et al. | 717/124 |
| 2002/0166117 A1 | 11/2002 | Abrams et al. | |
| 2002/0174222 A1 * | 11/2002 | Cox | 709/224 |
| 2003/0221012 A1 | 11/2003 | Herrmann et al. | |
| 2006/0294095 A1 * | 12/2006 | Berk et al. | 707/6 |
| 2007/0050719 A1 * | 3/2007 | Lui et al. | 715/762 |
| 2007/0233839 A1 * | 10/2007 | Gaos | 709/223 |
| 2007/0294682 A1 * | 12/2007 | Demetriou et al. | 717/153 |
| 2008/0028469 A1 * | 1/2008 | Repasi et al. | 726/24 |
| 2008/0215768 A1 * | 9/2008 | Reid et al. | 710/22 |
| 2008/0276102 A1 * | 11/2008 | MacKay et al. | 713/193 |
| 2010/0024036 A1 * | 1/2010 | Morozov et al. | 726/26 |

(Continued)

OTHER PUBLICATIONS

Title: Reducing the communication overhead of dynamic applications on shared memory multiprocessors, author: Sivasubramaniam, A, source: IEEE, dated: 1997.*

(Continued)

*Primary Examiner* — Chameli Das
(74) *Attorney, Agent, or Firm* — Boswell IP Law; J. Mason Boswell (57) ABSTRACT

A dynamic verification system is described that enables application developers to safely include significant custom business logic in their applications. The dynamic verification system receives application behavior criteria that specify behavior of an application of interest to an application host. The system executes an application and instruments an application execution environment to detect application behavior that meets the application behavior criteria. The system determines when the application has performed an action that satisfies the application behavior criteria and provides a notification about the application behavior that occurred that a system administrator can use to take action against the application.

19 Claims, 4 Drawing Sheets

U.S. PATENT DOCUMENTS

2010/0306732 A1* 12/2010 Zhu .................................. 717/105
2011/0307233 A1* 12/2011 Tseng et al. ..................... 703/14
2012/0042303 A1*  2/2012 Demetriou et al. ............ 717/129
2012/0066378 A1*  3/2012 Lui et al. ........................ 709/224

OTHER PUBLICATIONS

Title: System Dynamics Application to Motivating Tacit Knowledge Sharing Among Knowledge Workers, author: Wuhan Li Lei et al, dated: Oct. 12, 2008, source: IEEE.*

Hamilton James, "On Designing and Deploying Internet-Scale Services", Proceedings of the 21st conference on 21st Large Installation System Administration Conference, Date: 2007, pp. 231-242, vol. 21, USENIX Association Berkeley, CA, USA.

Ropars, et al. "Providing QOS in a Grid Application Monitoring Service", Date: Dec. 2006, 18 Pages.

Tao, Lixin, "Shifting Paradigms with the Application Service Provider Model", Date: Oct. 2001, 8 Pages, vol. 34, Issue: 10, Publisher: IEEE Computer Society Press Los Alamitos, CA, USA.

* cited by examiner

DYNAMICALLY MONITORING APPLICATION BEHAVIOR

BACKGROUND

It is becoming more and more common to run software applications in a shared hosting environment. For example, an application service provider (ASP) is a business that provides computer-based services to customers over a network. Those in the art often refer to software offered using an ASP model as on-demand software or software as a service (SaaS). The most limited sense of this business is that of providing access to a particular application program (such as medical billing) using a standard protocol such as HTTP. There is a growing market for hosted services where a hosting provider invites application developers or providers to submit and run their custom applications in an environment shared with other applications. This frees the application provider from the burden of purchasing and administering servers, and allows the hosting provider to realize economies of scale that come from managing many servers for hosted applications.

One type of application that is well suited for execution in a shared hosting environment is a model-based application. In the past computer software applications involved extensive programming knowledge and adaptation of low-level language functions to fit a particular business problem. For example, a user of a data management application may desire to add form processing functionality that was not included in the original application. Such a user could, optionally, pay for a systems integrator to come to the user's office and reconfigure or extend the application to include the desired functionality. Alternatively, if the user's company is large enough to have an IT department, the user could ask his or her IT manager to code in the additional functionality. This may, require a great deal of time from an already busy IT manager. As a last option, the user may opt to write the extension themselves, assuming the user has sufficient knowledge and available time to dedicate to such a task. Over time, users wanted to customize applications at lower cost and at a rate faster than software developers could provide changes.

To reduce the potential for errors and to simplify the process of creating applications related to business processes, software developers created model-based applications. Model-based applications use a data-driven approach to writing software, and typically include a model engine that executes model data created by the user. The model data allows the user to perform a variety of domain specific functions and to combine available functional components in various well-defined ways. Thus, a model engine provides a high level of customization without writing software code to unsophisticated application developers, at the expense of limiting functionality to those functions supported by the model engine. Generally, application developers use model engines for relatively simple things such as modeling workflows and corporate business policies. An example of a model-based application environment is Microsoft Access, in which users can define database tables, rules, and events in a data-driven environment.

In a shared hosting environment, the hosting provider limits the level of customization available to an application developer to reduce the potential of custom business logic to advertently or inadvertently exploit security holes on the shared system or to cause runaway loads on resources like memory, CPU, disk, and network bandwidth. A typical way that the industry has dealt with the potential for security/ runaway resource consumption is by seriously limiting the level of customization of business logic that a hosted application can have. This limitation is simply not acceptable to many users, who cannot get the application functionality they want. Another way is to create a container (e.g., a J2EE container) or a virtual machine to sandbox the resources that custom code can use. However, this approach fails in a "multi-tenant" situation (where multiple user applications are run in the same environment), because there is a significant overhead and cost to creating a full, self-contained sandbox for every application. Also, different end-user application want to access some of the same resources, e.g. connectors to external data or a reference or master data that is common in the industry for a lot of applications.

A third way of handling security/runaway resource consumption is to statically inspect the application to attempt to verify that the application does not perform any undesirable actions. For model-based applications, the model provides visibility into what the application does. Thus, static checks can determine, for example, resources on which the model depends. The static checks may include limits of acceptable application behavior, such as thresholds that limit the number of times any one application can use a particular resource. The difficulty with static checks is that they can grow very large and conservative. Sometimes an application may want to perform a complex, but legitimate behavior that fails a static check. Static checks may also be unable to detect some types of bad behavior. For example, the application may respond unfavorably to data input by a user that is not available before executing the application. In addition, identifying new static checks is often a process of trial and error, where an administrator adds new checks as a hosting provider discovers new offending application behavior.

SUMMARY

A dynamic verification system is described that enables application developers to safely include significant custom business logic in their applications. The dynamic verification system receives application behavior criteria that specify behavior of an application of interest to an application host. The system executes an application and instruments an application execution environment to detect application behavior that meets the application behavior criteria. The system determines when the application has performed an action that satisfies the application behavior criteria. The dynamic verification system provides a notification about the application behavior that occurred and identifies the application, the application behavior criteria, and information about the action that satisfies the application behavior criteria. The system administrator can use the information to take action against the offending application. Thus, the dynamic verification system provides a good hosting experience for hosting providers and application authors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A dynamic verification system is described that enables application developers to safely include significant custom business logic in their applications. A service host of the applications can run multiple applications in a shared environment with a high degree of assurance about the security and resource characteristics of the application without the overhead of running each application in its own sandboxed computing environment. The dynamic verification system detects application conditions at run-time that signal errant application behavior. For example, the system may monitor the number of calls to a specific resource and report when the number of calls exceeds a threshold. The dynamic verification system receives application behavior criteria that specify behavior of an application of interest to an application host. For example, the host may provide several criteria, such as a threshold of rows returned from a database query, a threshold usage of processing resources, and so forth. The system executes an application. For example, an application developer may provide a model-based application for execution in a shared hosting environment.

The dynamic verification system instruments an application execution environment to detect application behavior that meets the application behavior criteria. For example, a model engine may provide hooks that provide notifications when a model-based application attempts to perform various types of operations. The system determines when the application has performed an action that satisfies the application behavior criteria. For example, if the application exceeds the processing resource threshold, then the instrumentation provides information about the application's actions. The dynamic verification system provides a notification about the application behavior that occurred and identifies the application, the application behavior criteria, and information about the action that satisfies the application behavior criteria. The system administrator can use the information to take action against the offending application.

The dynamic verification system provides a number of advantages to hosting providers. This system includes dynamic checks, throttles, and metering that enable the hosted service to deal with things that can only or most easily be determined at run-time, such as the number of table rows returned by a query, loop iterations, number of people to whom an action sends a communication such as an email, and so on. The hosting provider can determine before a catastrophic event occurs that an application has undesirable behavior. The hosting provider can use this information to: 1) improve static checks of application behavior based on feedback about undesirable behavior that existing static checks missed, 2) contact the application author to either update the application to remove the undesirable behavior or receive payment from the application author for the increased resource usage of the application, and 3) load balance the application by increasing the resources available to the application and/or pairing the application on a shared system with other less resource-intensive applications. Dynamic checks are also less inflexible than static checks, and allow a hosting provider to provide more leeway to applications to run using a "wait-and-see" approach to determining if the application performs undesirable behavior. Thus, the dynamic verification system provides a good hosting experience for hosting providers and application authors.

Dynamic checks can include many different application behavior criteria. For example, dynamic checks can include monitoring the number of rows returned from a database query, the number of iterations that a logical loop has performed, the number of email recipients that an application is sending email to, the resource usage of the application, and so forth. Resource monitoring can include current, historical, and cumulative resource consumption. Those of ordinary skill in the art will recognize that the system can monitor these and many other criteria using the principles described herein.

The dynamic verification system may take many different actions based on detected application behavior. For example, the system can terminate execution of the application, inform the application provider of potential errors in the application, charge the application provider a higher fee for hosting the application, and improve static application checks in hopes of detecting the behavior earlier. The system may identify the offending business logic, including the actions and expressions that are causing the resource usage or other undesirable application behavior. The system may also modify the future execution permission of the application, such as limiting the time of day the application can run, running the application at lowered priority, preventing the application from running, or running the application if a higher hosting fee has been paid. The system may take these and many other actions in response to detecting actions of the application that satisfy application behavior criteria. In addition, the system accepts different criteria for taking different actions. For example, one level of resource usage by an application may lead to the system sending an administrative warning, and a higher threshold of resource usage may lead to the system terminating the application.

Figure 1:
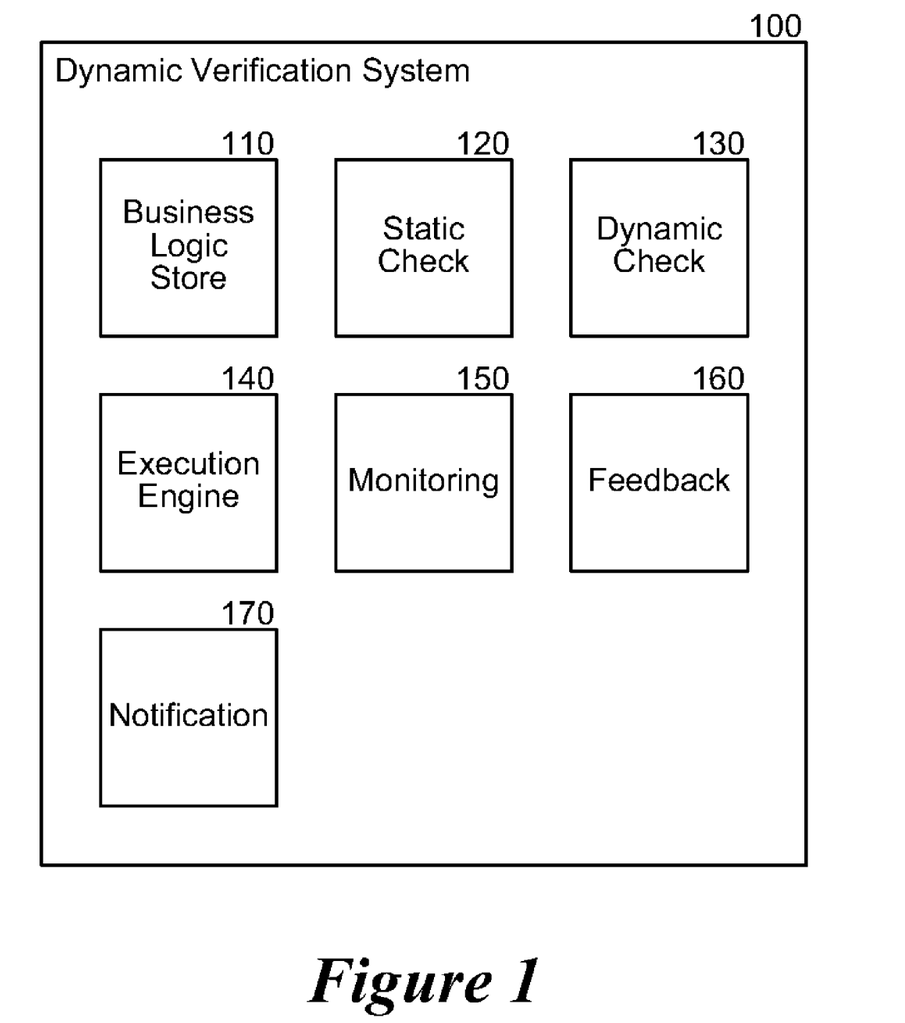
FIG. 1 is a block diagram that illustrates components of the dynamic verification system, in one embodiment.

FIG. 1 is a block diagram that illustrates components of the dynamic verification system, in one embodiment. The dynamic verification system 100 includes a business logic store 110, a static check component 120, a dynamic check component 130, an execution engine component 140, a monitoring component 150, a feedback component 160, and a notification component 170. Each of these components is described in further detail herein.

The business logic store 110 provides storage for applications or other business logic after it has passed static checks. The business logic store 110 may use a database, file system, or other suitable storage system. The business logic store 110 is not directly accessible to application providers to prevent storing malicious application logic that the system 100 has not validated. The business logic store 110 also stores feedback from dynamic checks and resource monitoring. This additional metadata may include information about a) heavy resource consumers that the system 100 will not allow to run, b) high resource consumers that the system 100 will allow to run with limitations (e.g., only at certain times of the day, with a reduced priority, or require additional money from the user), c) standard resource consumers that the system 100 will allow to run anytime.

The static check component 120 performs static analysis of application logic. The system 100 typically invokes the static check component 120 when the system 100 receives a new application from an application provider and before the application logic is stored in the business logic store 110. Static checks may examine the model of a model-based application to determine whether the application has any behavior that is out of the ordinary. Those of ordinary skill in the art will recognize that substantial research and analysis is available about static analysis of model-based and typical executable applications.

The dynamic check component 130 performs dynamic analysis of application logic while the application is running. The dynamic check component 130 may operate by instrumenting the execution engine component 140 or receiving notifications from the execution engine when certain events occur. For example, the execution engine may notify the dynamic check component 130 when an application requests resources, accesses external data, exceeds a resource usage threshold, and so forth. A system administrator can update the dynamic check component 130 with additional dynamic checks as the administrator discovers new behaviors or criteria that are desirable to monitor. Dynamic checks are in place, in part, to ensure that applications do not exceed hard limits on resources. Typically, the administrator will set limits for memory, CPU time, and other resources. If business logic consumes more than these limits, the system stops or pauses execution of the application. Since dynamic checks typically fail when a resource limit has been hit, and at that point a resource has been heavily consumed, it is worthwhile to detect these situations in the static checks whenever possible. For applications that do not cause a dynamic check failure, execution monitoring watches the resource utilization. If resource utilization gets high (but not too high), feedback is sent to the application provider, noted for future execution of the application, and fed back to the static checks to make them stronger.

The execution engine component 140 executes applications according to the model appropriate for the application. The execution engine component 140 may be specific to a domain-specific model with explicit rules and operations, or may be standard central processing unit (CPU). The execution engine component 140 examines the application model and performs steps defined by the model based on the behavior requested by the application. For example, the application may contain rules that the execution engine component 140 invokes under appropriate conditions. Applications can request that the execution engine component 140 perform undesirable instructions that are malicious, affect other applications, or have other negative behavior. In addition, the application even with good intentions by the application provider may contain errors or poorly performing logic that, when executed, has a negative effect on the system 100. The static check component 120 and dynamic check component 130 attempt to catch such application behavior so that the system 100 can stop the application and maintain the integrity of the system 100.

The monitoring component 150 monitors the execution of application logic by the execution engine component 140 and provides information to the other components of the system about what actions an application is performing. The monitoring component 150 keeps track of use of resources by an application's business logic, in particular use of resources by actions and expressions. The monitoring component 150 tracks the current usage, the historical usage, and the cumulative usage of each application hosted by the system 100. The monitoring component 150 also gathers an understanding of the distribution of the resource usage across applications. The monitoring component 150 can correlate the usage or resources to different types of actions and expressions, including permutations of actions and expressions in an application.

The feedback component 160 provides feedback to the static check component 120 about the effectiveness and ways to improve various static checks. The feedback component 160 may identify frequently repeated behavior that had a negative effect on the performance of the system 100 and behavior that caused an administrator or dynamic check to terminate an application. For model-based applications, the feedback component 160 can mark the offending types and patterns in business logic, so that the static check becomes more comprehensive itself. The feedback component 160 may also gather information for transmission to an application provider describing anomalies or undesirable aspects of applications provided by the application provider. The application provider can use this information to understand the application's impact on the system and improve the application. The system 100 may also give the application provider the option to pay a higher fee if he/she really wants his/her business logic to continue consuming greater than normal amounts of resources.

The notification component 170 notifies a system administrator or other components, such as the dynamic check component 130, when undesirable behavior occurs. When an administrator has not defined checks that are more specific, the last defense of the system 100 against bad application behavior may be detecting hogging of resources (e.g., CPU usage over 90% or high memory usage). The notification component 170 provides an opportunity for intervention before the system automatically terminates the application. The notification component 170 may also work with the feedback component 160 to provide information to the application provider about an impending termination of the application by the system 100 or other information useful to the application provider.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
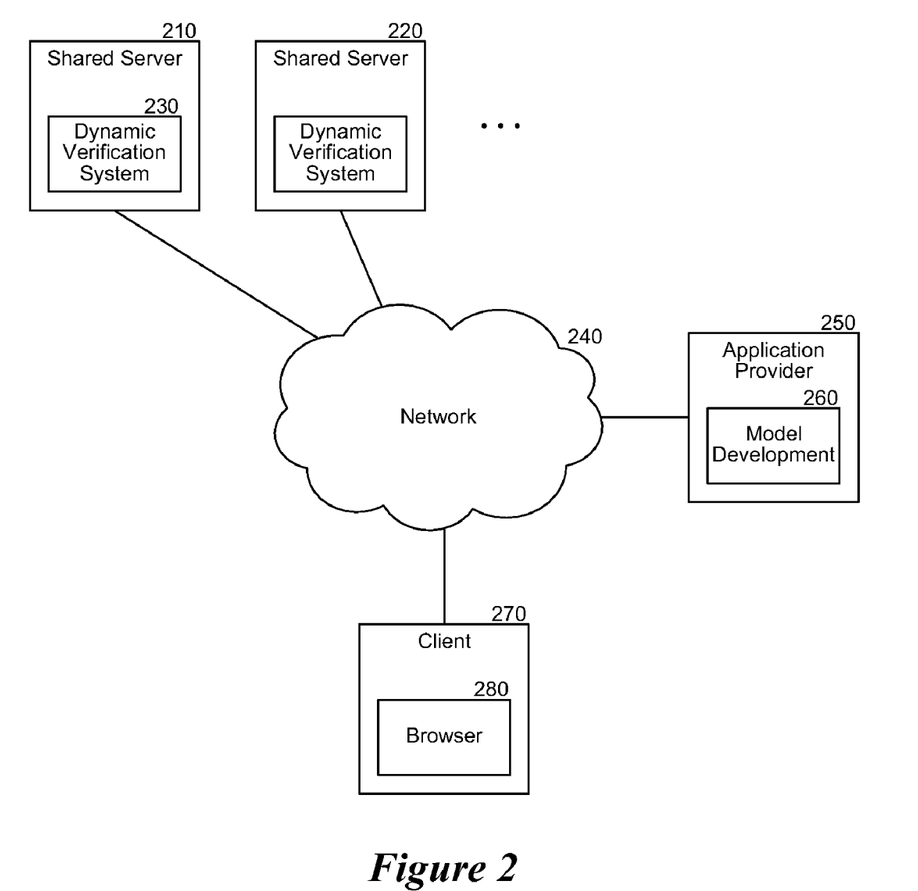
FIG. 2 is a block diagram that illustrates a typical operating environment of the dynamic verification system, in one embodiment.

FIG. 2 is a block diagram that illustrates a typical operating environment of the dynamic verification system, in one embodiment. A hosting provider provides one or more shared servers 210 and 220 for hosting network-based applications.

The hosting provider may load balance applications across servers 210 and 220 according to well-known techniques in the art. Each server 210 includes an instance 230 of the dynamic verification system described herein. The dynamic verification system monitors application usage of the server 210 and ensures the ongoing availability of the server 210 for hosting applications. The servers 210 and 220 are connected to a network 240, such as the Internet or a corporate local area network (LAN). Through the network 240, an application provider 250 can communicate with the servers 210 and 220 of the hosting provider to upload new applications for execution on the servers 210 and 220. The application provider 250 uses a model development environment 260 to develop applications that adhere to a well-defined model. The dynamic verification system may also include static and dynamic checking components that are included with the model development environment 260 to allow application developers to detect application errors even before the application provider transmits the applications to the hosting provider. A client 270 connects to an application hosted on servers 210 and/or 220 through the network 240. The client 270 may include a browser 280 or other suitable client application for accessing the network-based application hosted by servers 210 and/or 220.

In some embodiments, the dynamic verification system receives additional information for performing dynamic checks from the model. For example, the model may identify integrity rules that test the validity of data. It is generally invalid to return rows from an integrity rule, so a dynamic check can provide a notification if that condition occurs. As another example, the dynamic verification system can determine from the model when rows are returned if the application is performing validation or in a transaction, which typically do not return rows of data. Another example is detecting that the application is continually trying a transacted operation and rolling back the transaction. If the behavior is due to bad data entered by a user, then the behavior is expected, but if not then it is likely caused by an application error. The model can include instructions, rules, constraints, and expressions created by the application provider. By inspecting the model, the dynamic verification system can verify many conditions at run-time. The model provides context for why the application is doing something so that the system knows more than what the application is doing.

In some embodiments, the dynamic verification system provides feedback to other components of the system, such as the static checking component. For example, when a dynamic check identifies bad application behavior, the system may identify static checks that could have identified the behavior before run-time. Static checks may include thresholds, such as a number of rows that is expected to be more than typical in response to a query, that the dynamic verification system can tune based on historical application behavior.

In some embodiments, the dynamic verification system uses dynamic checks to reward application providers. For example, the dynamic verification system may include a rule or application behavior criteria that monitors sales through an e-commerce function provided by the model engine. If, for example, the application exceeds a weekly sales amount greater than other applications, then the hosting provider may provide a discount to the application provider for hosting services. As another example, the hosting provider may provide a discount for hosting applications that behave desirably, such as having few expensive database queries or making efficient use of hosted resources.

Figure 3:
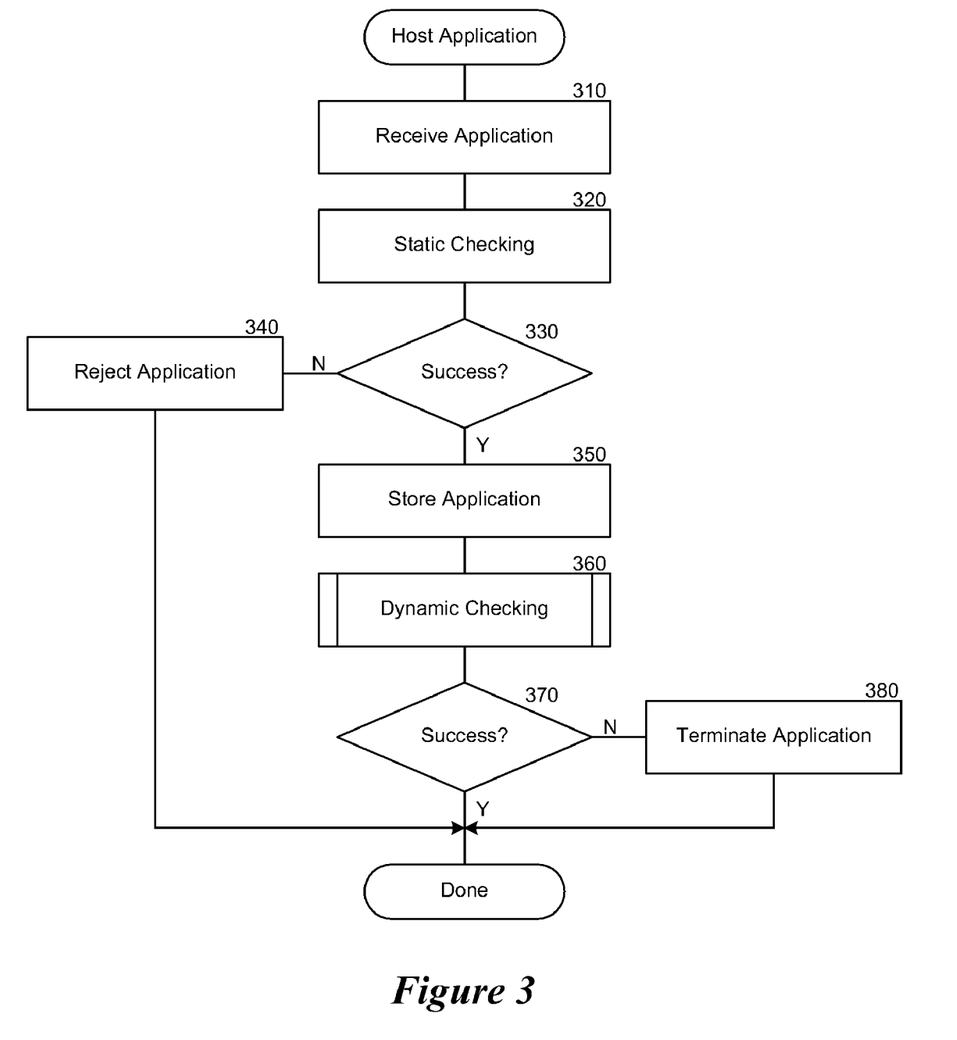
FIG. 3 is a flow diagram that illustrates the overall process performed by the system to host applications, in one embodiment.

FIG. 3 is a flow diagram that illustrates the overall process performed by the system to host applications, in one embodiment. In block 310, the system receives an application from an application provider. For example, the application provider may upload the application through a web-based administrative interface of the hosting provider or through a web services method. In block 320, the system performs static checks on the received application. For example, the system may determine which external resources the application accesses and whether those resources are allowed for the application. In decision block 330, if the static checks succeed, then system continues at block 350, else the component continues at block 340. In block 340, the system rejects the application. For example, the system may provide the application provider with an error response and an explanation of the reason for rejecting the application so that the application provider can improve the application. After block 340, the system completes.

In block 350, the system stores the application in the business logic store and awaits execution of the application. For example, the system may invoke the application when a client accesses a web page at a particular uniform resource locator (URL) of the hosting provider. In block 360, the system runs the application and performs dynamic checking of the application as further illustrated in FIG. 4. In decision block 370, if the dynamic checking succeeds, then the application continues until execution is done and the system completes, else the system continues at block 380. In block 380, the system terminates the application. Alternatively, the system may log information about the dynamic check that the application failed and continue executing the application. After block 380, these steps conclude.

Figure 4:
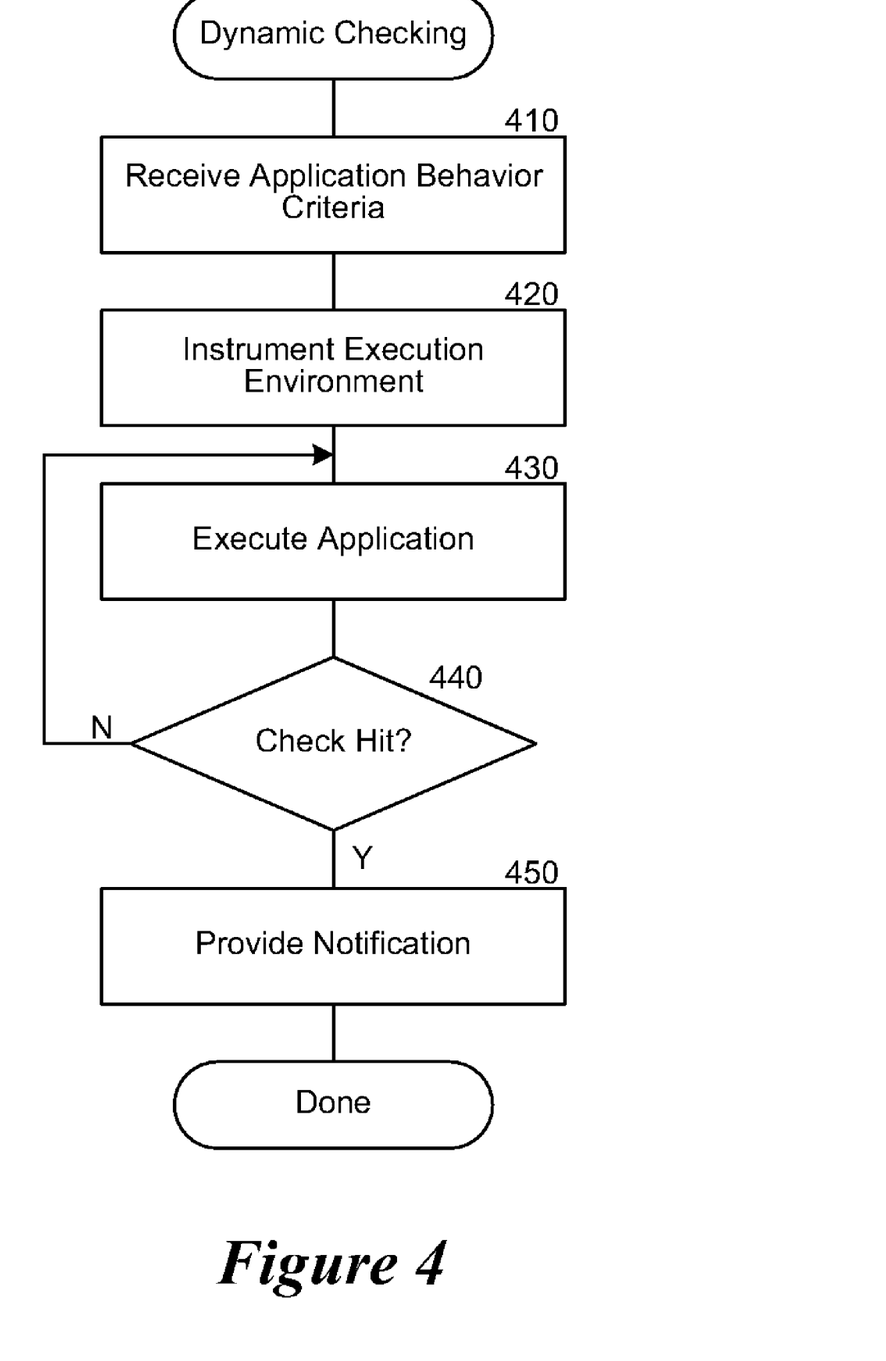
FIG. 4 is a flow diagram that illustrates the processing of the dynamic checking component, in one embodiment.

FIG. 4 is a flow diagram that illustrates the processing of the dynamic checking component, in one embodiment. In block 410, the component receives application behavior criteria. The hosting provider or the application provider may provide the application behavior criteria based on application actions that either provider does not expect to occur. The hosting provider may set up the criteria before executing any applications and thus block 410 may not occur again with the execution of each application. In block 420, the component instruments the execution environment to detect conditions that are relevant to dynamic checks. For example, a model engine may provide notifications when relevant events occur. The hosting provider may install an instrumented version of the model engine once for all applications and thus block 420 may not occur again with the execution of each application. In block 430, the component executes the application in coordination with the execution environment. For example, the component may load a model-based application into the model engine. In decision block 440, if the application satisfies a criterion for hitting a dynamic check, then the component continues at block 450, else the component loops to block 430 and continues executing the application. For example, the execution engine may detect that an application is consuming excessive resources covered by a dynamic check. In block 450, the component provides a notification to other components of the system that can take action based on the dynamic check that the application hit. For example, the component may log an event to the event log of the server, notify a system administrator, terminate the application, and so forth.

From the foregoing, it will be appreciated that specific embodiments of the dynamic verification system have been described herein for purposes of illustration, but that various modifications may be made without deviating from the spirit and scope of the invention. For example, although hosted applications are described through examples, the system can also verify stand-alone applications on a client system using the techniques provided. The system may provide dynamic checks in this way in a model development environment so that an application provider can test an application before sending the application to the hosting provider. In addition, although model-driven applications are described through examples, the system can also be used with other types of applications where the execution environment can be instrumented to detect events at run-time that pertain to dynamic checks. Accordingly, the invention is not limited except as by the appended claims.

We claim:

1. A computer-implemented method for monitoring behavior of an application executed in a shared hosting environment, the method comprising:
    receiving application behavior criteria that specifies behavior of an application of interest to an application host, wherein the shared hosting environment executes other applications at the same time as the application and wherein the application behavior criteria identifies application behavior that interferes with executing another application;
    instrumenting an application execution environment to detect application behavior that meets the application behavior criteria, wherein instrumenting provides hooks that provide notifications about the application's actions as the application executes;
    executing an application in the shared hosting environment;
    determining that the application has performed an action that satisfies the application behavior criteria; and
    providing a notification that the application behavior has occurred, wherein the notification identifies the application, the application behavior criteria, and information regarding the action that satisfies the application behavior criteria.

2. The method of claim 1 further comprising, upon determining that the application has performed an action that satisfies the application behavior criteria, terminating execution of the application.

3. The method of claim 1 further comprising, based on the notification, requesting from an application provider an updated version of the application.

4. The method of claim 1 further comprising, upon determining that the application has performed an action that satisfies the application behavior criteria, charging an application provider an additional fee to continue allowing the application behavior.

5. The method of claim 1 wherein instrumenting an application execution environment comprises modifying an application model engine.

6. A computer system for dynamically verifying safety of an application for execution by a multi-tenant hosting provider, the system comprising:
    a business logic store configured to store one or more applications for execution by the multi-tenant hosting provider;
    an execution engine configured to execute applications based on a domain-specific application model; and
    a dynamic checking component configured to perform dynamic verification checks of the application's behavior while the application is executing, wherein the dynamic checking component instruments the application and wherein instrumenting provides hooks that provide notifications about the application's actions as the application executes, wherein the execution engine executes other applications at the same time as the application and wherein the dynamic verification checks identify application behavior that interferes with executing another application.

7. The system of claim 6 further comprising a static checking component configured to perform static verification checks of the application without executing the application.

8. The system of claim 7 wherein the dynamic checking component is further configured to provide feedback to the static checking component to improve static verification checks.

9. The system of claim 6 further comprising a monitoring component configured to monitor run-time behavior of the application and provide notification when the behavior fails a dynamic verification check.

10. The system of claim 9 wherein the monitoring component is further configured to track historical execution information for applications.

11. The system of claim 6 further comprising a notification component configured to notify an application developer when the application fails a dynamic verification check.

12. A computer-readable storage device encoded with instructions for controlling a computer system to verify behavior of an application, by a method comprising:
    receiving an application from an application developer for execution in a shared hosting environment;
    performing one or more static checks of the received application to determine whether the application includes negative behavior;
    storing the application in a data store for later execution;
    executing the application in the shared hosting environment;
    while the application is executing, performing one or more dynamic checks of the application to determine whether the application includes negative behavior at run-time, wherein the dynamic checks provide hooks that provide notifications about the application's actions as the application executes, wherein the shared hosting environment executes other applications at the same time as the application and wherein the static and dynamic checks identify application behavior that interferes with executing another application.

13. The device of claim 12 further comprising, if the application includes negative run-time behavior, terminating execution of the application.

14. The device of claim 12 further comprising, if the application includes negative behavior, sending information regarding the negative behavior to the application developer.

15. The device of claim 12 further comprising, if the application includes negative behavior, notifying the application developer of the actions and expressions of an application model that are causing the negative behavior.

16. The device of claim 12 further comprising, if the application includes negative behavior at run-time, requesting an additional fee for hosting the application.

17. The device of claim 12 further comprising, if the application includes negative behavior at run-time, executing the application at a lower priority.

18. The device of claim 12 wherein at least one dynamic check determines a number of rows returned by a database query.

19. The device of claim 12 wherein at least one dynamic check determines a number of recipients of a communication.

* * * * *